Sept. 2, 1930.   C. W. FINNEY   1,775,069
VALVE SPRING RETAINER
Filed Sept. 10, 1926   2 Sheets-Sheet 1
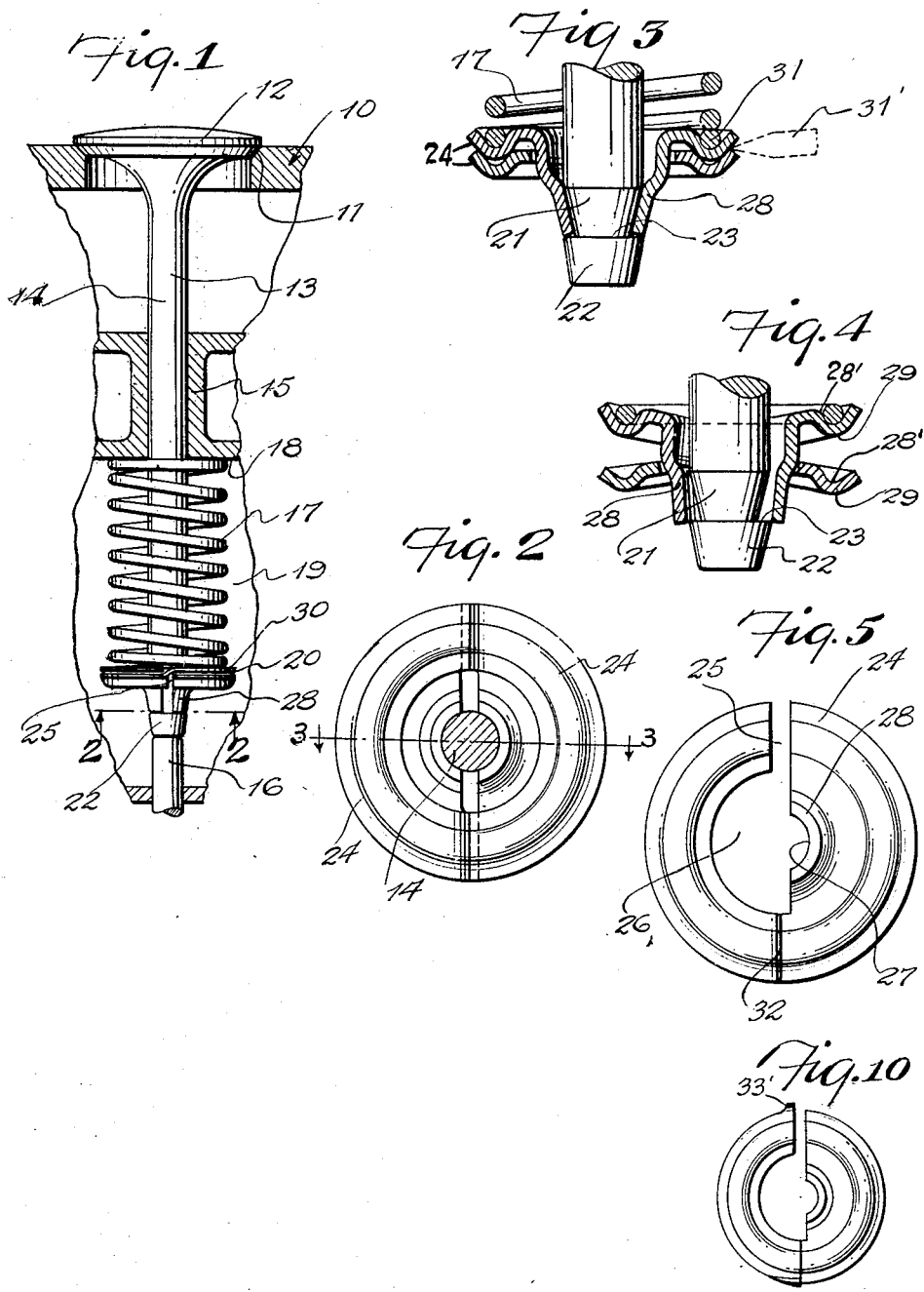

Sept. 2, 1930.  C. W. FINNEY  1,775,069
VALVE SPRING RETAINER
Filed Sept. 10, 1926    2 Sheets-Sheet 2
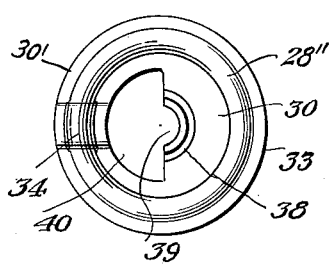
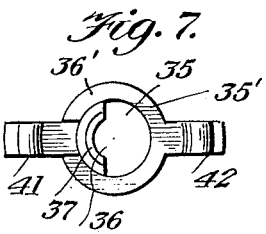
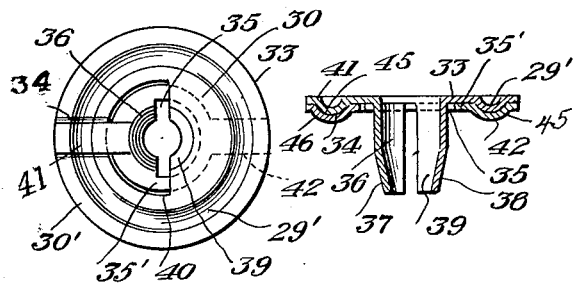
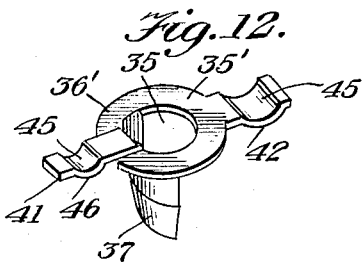
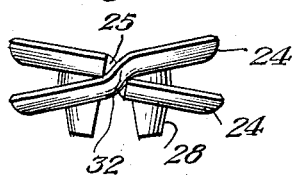
Curtis W. Finney
INVENTOR
BY Victor J. Evans
ATTORNEY Patented Sept. 2, 1930

1,775,069

UNITED STATES PATENT OFFICE

CURTISS W. FINNEY, OF DETROIT, MICHIGAN

VALVE-SPRING RETAINER

Application filed September 10, 1926. Serial No. 134,731.

This invention relates to certain novel improvements in valve spring retainers and more especially to a valve spring retainer adapted to be used in connection with valves of the puppet type adapted for internal combustion engines or motors.

One of the many objects of this invention is to provide a device of this character which will be highly efficient in use and economical in manufacture.

Another object of this invention is to provide a valve spring retainer which can be expeditiously positioned on the valve stem for holding the spring without the use of the usual spring retaining pin.

Another object of the invention is to provide a device of this character which is constructed in such a manner as to permit quick yet secure anchorage of the outer end of the spring in its position about the valve stem with the desired degree of compression against its bearing face and which will act to hold the spring firmly and accurately.

A still further object of the invention is the provision of a device of this character formed of two parts adapted for interfitting relation when associated with a valve stem for positively retaining the valve spring in its proper operative position.

A further object of the invention is to provide a so-called valve stem washer which may be removably held in place upon the end of the valve stem and which may be quickly applied and removed so that the valve and its stem may be removed readily for any purpose desired and which will be compact, simple, and durable for holding the valve spring firmly in its proper operative relation with respect to a valve stem.

A further object of the invention is to provide a device of this character comprising interfitting parts each provided with bulbous skirts which are adapted when assembled on the lower end portion of a valve stem to have clamping relation with the valve stem for preventing accidental displacement of the spring retainer and said clamping relation being accomplished by the pressure of the spring on the retainer.

Other objects will appear hereinafter.

The invention consists in the novel combination and arrangement of parts to be hereinafter described and claimed.

The invention will be best understood by reference to the accompanying drawing showing the preferred form of construction and in which:

Fig. 1 is a fragmentary sectional detail view of a valve chamber of an internal combustion engine or motor illustrating my improved valve spring retainer associated with the valve thereof, Fig. 2 is a sectional detail view taken substantially on line 2—2 of Fig. 1, Fig. 3 is a vertical transverse sectional detail view of my improved valve spring retainer on the line 3—3 on Fig. 2, Fig. 4 is a sectional detail view similar to that illustrated in Fig. 3 but showing the parts in open position to permit the removal of the valve spring retainer from the lower end portion of the valve stem, Fig. 5 is a bottom view of one of the elements of my improved valve spring retainer, Fig. 6 is a bottom view similar to that illustrated in Fig. 5 but showing a modified form of construction, Fig. 7 is a bottom view of the other element of the valve spring retainer than the one illustrated in Fig. 6, Fig. 8 is a top plan view of the valve spring retainer elements illustrated in Figs. 6 and 7 in assembled position, Fig. 9 is a horizontal sectional view taken through Figure 8.

Fig. 10 is a bottom view of one of the elements of the valve spring retainer showing a modified form of construction, Fig. 11 is a side elevational view of the parts depicted in Fig. 4, Figure 12 is a perspective view of the complemental section of the modification.

In the drawing 10 indicates a fragmentary portion of a valve chamber of an internal combustion engine. This valve chamber provides a seat 11 upon which the head 12 of the valve 13 is adapted to rest. The stem 14 which is formed as an integral part of the head 12 is received in a bearing 15 provided by the valve chamber. This valve stem is operated in the usual manner through the medium of a tappet 16 which is operated by operation of the cams (not shown) of the cam shaft in a well known manner.

It is the ordinary practice in order to retain the valve head 12 in its proper position with the seat 11 to provide a spring 17 which engages the under sides 18 of the bearing 15 and is confined in the valve casing 19 of a well known construction. This spring 17 is held in proper operative operation with respect to the valve stem 14 through the medium of my improved retaining washer generally indicated at 20.

The valve stem 14 at its lower end portion is provided with a frusto-conical shaped portion 21 which terminates into a head 22 which is greater in diameter than the small end of the portion 21 so as to provide an annular seat 23 which is adapted to be engaged by certain elements of my improved valve spring retainer when in operative relation with the valve stem.

My improved valve spring retainer as illustrated in Figs. 2 to 5 inclusive comprises two discs 24. These discs 24 are struck from the sheet of required material and are each constructed similar and capable of being formed by one stamping operation. The discs each being similar I will in the descriptive part relating thereto describe but one of the discs as it will be apparent that the other being similar the description is equally applicable thereto.

In this connection particular attention is directed to Fig. 5 of the drawing wherein it will be seen that the disc is provided with a slit or slot 25. This slot 25 terminates in a semi-circular opening 26, and opening into this semi-circular opening is a smaller semi-circular opening 27. This smaller semi-circular opening 27 is provided by the bulbous skirt 28 which depends from the under side of the disc. Each disc has formed contiguous its peripheral edge with an annular groove 28' providing a rib 29 and the rib 29 of one disc is adapted to be seated in the groove 28' of the other disc. Each disc has a semi-circular portion 30 off-set from the plane of the remaining semi-circular portion of the disc to provide unbroken off-set surfaces when the discs are arranged in interfitting relation with respect to each other.

The groove 28' of the discs of my improved valve spring retainer is adapted to receive the lower convolution 31 of the spring 17. To assemble my improved valve spring retainer as above described the discs are disposed substantially at right angles with respect to each other with the slot 25 of each arranged to move transversely with respect to the other disc and when the discs have been moved the required distance transversely of each other the slot of one of the discs will receive the portion 32 of the other of the discs opposite its slot and after this has been accomplished the discs are turned back upon each other to dispose the rib 29 of each disc in the groove 28' of the other of the discs. In this position the discs are ready to be operatively associated with the valve stem and this is accomplished in the following manner.

When the discs are arranged in interfitting relation in the manner above described the skirts 28 will provide a bearing surface which is adapted to embrace the frusto-conical shaped portion 21. In applying the valve spring retainer the head 22 is disposed at the mouth of the opening provided by the semi-circular openings 27 of the discs and pressure is exerted on the retainer to move the same longitudinally of the valve stem. As the head is urged to pass through the opening the skirts being engaged by this head and providing an opening which is smaller in diameter than the head, will urge the discs to pivot diagonally with respect to each other in the manner shown in Figs. 4 and 11, said pivoting being permitted by the above connection which is provided by the slot 25 and the portion 32 of the disc. Further movement of the retainer in this direction will dispose the skirts above the seat 23. When the skirts are in this position the valve spring 17 is permitted to bear down upon the retainer and in doing so the discs are pivoted back upon each other disposing the skirts in engagement with the seat 23 of the head 22 thus holding the retainer against displacement by action of the valve spring or otherwise.

To remove the retainer from the valve stem it is only necessary to pivot the discs diagonally with respect to each other to dispose the skirts 28 out of engagement with the seat 23 on the head 22 and this is accomplished by placing the tip 31' of a screw driver or other instrument at a point whereby when pressure is applied to the screw driver the tip of the same will move between the discs and pivot the same in the direction illustrated in Figs. 4 and 11 and in this position it will be noted that the skirts are free from engagement with the seat 23 and that the resilient pressure of the spring 17 will force the retainer off of the end of the valve stem.

In Figs. 6 to 9 inclusive I have illustrated a modified form of construction and in this construction the retainer includes a disc 33 which is constructed along lines similar to the construction of each of the discs 24 with the exception that the slot 25 is omitted and formed in one of the semi-circular portions 30' of this disc is a transverse groove 34 let in the upper side thereof. The other disc 35' of this retainer as illustrated in Fig. 7 includes the semi-circular opening 35 and opening into this semi-circular opening 35 is a semi-circular opening 36 provided by the skirt 37. The disc 33 is likewise provided with a skirt 38 which defines the semi-circular opening 39 opening into the enlarged semi-circular opening 40. The disc 35' is provided with oppositely disposed arms 41 and 42 the arm 41 being off-set from the plane of the arm 42 for reasons hereinafter set forth. The disc 33 is likewise provided with an annular groove 28'' within which the end convolution 31 of the spring 17 is adapted to be received.

To assemble the retainer as disclosed in Figs. 6 to 9 inclusive the arm 41 is inserted through the opening 40 from the under-side of the disc 33 and when completely inserted the portion of the disc 35' opposite the portion 36' will encircle the skirt 39 with the arm 41 seated in the groove 34. The arm 42 will be disposed on the lower side of the disc 33 while the arm 41 is arranged in its groove 34 on the top side thereof as above set forth and each of these arms have formed therein grooves 45 which provide ribs 46 adapted to be seated in the groove 29' of the disc 33 so that a continuous even surface is provided for the lower convolution of the spring 17. The assembling and disassembling of the retainer as disclosed in the modified form of construction is substantially similar to that illustrated in the drawings and herein described with reference to the preferred form of construction.

In Fig. 10 I have illustrated a disc which is constructed substantially similar to the disc illustrated in Fig. 5 with the exception that this disc includes on opposite sides thereof stop elements 33' which are adapted to limit the pivotal movement of the disc when taken off or placed upon the valve stem.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. A valve spring retainer including two members having interfitting relation with respect to each other to permit said members to be pivoted on each other a predetermined distance to dispose themselves in diagonal relation with respect to each other and provided with laterally projecting portions providing an opening, said laterally projecting portions adapted to have clamping relation with the valve stem and said members being adapted to be held in superimposed position with the projecting portions in said clamping relation by connection of a valve spring.

2. The combination with a valve stem provided with an annular seat at one end portion, and a spring embracing the valve stem, of a removable retainer for said spring, said retainer including two members having interfitting relation with respect to each other permitting predetermined pivotal movement of the members on each other to dispose themselves in diagonal relation with respect to each other, and skirts projecting laterally from the members, said skirts being substantially semi-circular in cross section and adapted when the two superimposed members are disposed one on top of the other to have clamping relation with said end portion and engage said annular seat, said members being adapted to be pivoted on each other by the insertion of a tool between the two members to dispose the skirts in non-clamping relation with respect to the said end portion.

3. The combination with a valve stem provided with an annular seat at one end portion, and a spring embracing the valve stem, of a removable retainer for said spring, said retainer including two discs having interfitting relation with respect to each other permitting predetermined pivotal movement of the discs on each other to dispose themselves in diagonal relation with respect to each other, and skirts projecting laterally from the discs, said skirts being substantially semi-circular in cross section and adapted when the two discs are disposed one on top of the other to have clamping relation with said end portion and engage said annular seat, said discs being adapted to be pivoted on each other by the insertion of a tool between the two discs to dispose the skirts in non-clamping relation with respect to the said end portion, said discs having annular grooves formed therein for the reception of the convolution of the spring.

4. The combination with a valve stem provided with an annular seat at the end portion, and a spring embracing the valve stem, of a removable retainer for said spring, said retainer including two members having interfitting relation with respect to each other permitting predetermined pivotal movement of the members on each other to dispose themselves in diagonal relation with respect to each other, and skirts projecting laterally from the members, said skirts being substantially semi-circular in cross section and adapted when the two members are disposed in superimposed position to have clamping relation with said end portion and engage said annular seat, said members being adapted to be pivoted on each other by the insertion of a tool between the two members to dispose the skirts in non-clamping relation with respect to the said end portions, said members having opposite corresponding semi-circular portions off-set relative to the plane of the remaining off-set corresponding semi-circular portions of the members whereby said members when disposed in superimposed position will provide an unbroken seating surface for the spring.

5. A valve spring retainer including two discs, each of said discs being provided with a semi-circular opening and a slot opening into said opening and a lateral skirt providing a small semi-circular opening opening into said first mentioned semi-circular opening, said slot of each of the discs permitting said discs to be arranged in interfitting relation with respect to each other with the skirt of each of the discs disposed opposite the skirt of the other of the discs to provide an opening for the passage of an end portion of a valve stem.

6. A valve spring retainer including two discs, each of said discs being provided with an opening and a slot leading into said opening, and a skirt providing a semi-circular opening opening into said first mentioned opening, said slots permitting said discs to be arranged in interfitting relation with respect to each other and permitting predetermined pivotal movement of the discs on each other on transverse lines through the discs.

7. A valve spring retainer including two discs, each of said discs being provided with an opening and a slot leading into said opening, and a skirt providing a semi-circular opening opening into said first mentioned opening, said slots permitting said discs to be arranged in interfitting relation with respect to each other and permitting predetermined pivotal movement of the discs on each other on transverse lines through the discs, each of said discs having a portion on one side of the transverse line off-set with the remaining portion of the disc on the other side of the transverse line.

8. A valve spring retainer including two discs, each of said discs being provided with a semi-circular opening and a slot opening into said opening and a lateral skirt providing a small semi-circular opening opening into said first mentioned semi-circular opening, said slot of each of the discs permitting said discs to be arranged in interfitting relation with respect to each other with the skirt of each of the discs disposed opposite the skirt of the other of the discs to provide an opening for the passage of an end portion of a valve stem, each of said discs having a portion on one side of a transverse line off-set from the remaining portion of the disc on the other side of the transverse line.

In testimony whereof I affix my signature.

CURTISS W. FINNEY.